United States Patent Office 3,422,103
Patented Jan. 14, 1969

3,422,103
7(AMINOPHENYLACETAMIDO)
CEPHALOSPORANIC ACIDS
Wilfred Frank Wall, Chalfont St. Peter, Michael Fatherley, Slough, and Brian Boothroyd, Beaconsfield, England, assignors to Glaxo Laboratories Limited, Greenford, England, a British company
No Drawing. Continuation of application Ser. No. 596,004, Nov. 21, 1966, which is a continuation of application Ser. No. 293,581, July 5, 1963. This application Aug. 11, 1967, Ser. No. 660,141
Claims priority, application Great Britain, July 20, 1962, 28,039/62
U.S. Cl. 260—243    4 Claims
Int. Cl. C07d 99/24; A61k 21/00

ABSTRACT OF THE DISCLOSURE

Aminophenylacetamido cephalosporanic acids and a process for their production via N-tritylated intermediates are disclosed.

---

This application is a combination of application S.N. 596,004, filed Nov. 21, 1966 which in turn is a continuation of application S.N. 293,581 filed July 5, 1963, both now abandoned.

This invention is concerned with improvements in or relating to antibiotics and is in particular concerned with the production of analogues of cephalosporin C.

The constitution of cephalosporin C has been interpreted in terms of the following structure:

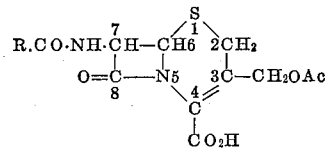

where $R = -(CH_2)_3.CH(NH_2)COOH$ and consequently the structure of the novel derivatives described below is presented in an analogous fashion.

In view of the somewhat unusual nature of the acyl side chain R in cephalosporin C it is desirable to be able to prepare analogues of cephalosporin C in which R is some other aminoacyl group with a view to utilizing the resultant compounds as antibiotics or as intermediates in the preparation of still further analogues of cephalosporin C.

We have now found that this can be accomplished in good yield by the reaction of 7-aminocephalosporanic acid with an acylating reagent which is a mixed anhydride of a lower alkanoic acid and the amino acid corresponding to the desired group R, but in which the amino group is protected by a triarylmethyl group e.g. trityl, and thereafter removing the triarylmethyl group.

According to the information, therefore, there is provided a process for the production of aminoacyl analogues of cephalosporin C which comprises reacting 7-aminocephalosporanic acid with a mixed acid anhydride of a lower alkanoic acid and the amino acid corresponding to the desired side chain, the amino group of which is protected by a triarylmethyl group and thereafter removing the triarylmethyl group to form the desired analogue.

The mixed anhydride used in the process according to the invention is conveniently prepared by reaction of a lower alkyl haloformate with the N-triarylmethyl derivative of the amino acid corresponding to the desired aminoacyl group. This reaction may be carried out at −40° C. to +20° C., preferably at −20° to +10° C. and is desirably effected in the presence of an acid binding agent, e.g. a tertiary organic base, in solution in an inert organic solvent.

The resulting mixed anhydride may thus be reacted with 7-aminocephalosporanic acid (7-ACA) without isolation and under the same temperature conditions, the 7-aminocephalosporanic acid preferably being added as a precooled solution in the same organic solvent or in an organic solvent miscible therewith. The reaction results in the formation of the N-triarylmethyl derivative of the desired aminoacyl analogue together with carbon dioxide, and the lower alkanol corresponding to the lower alkyl haloformate as by-products.

The N-triarylmethyl derivative of the desired aminoacyl analogue may be recovered from the reaction mixture, for example, by evaporation in vacuo of the solvent leaving the derivative as a residue.

The triarylmethyl group is then removed from the resulting N-triarylmethyl derivative in any convenient manner. This may, for example, be effected by hydrolysis or hydrogenolysis. Hydrolysis is preferably effected with aqueous acid at a pH of 1 to 5 at a temperature of 0–50° C., preferably at ambient temperature. It is particularly preferred to effect hydrolysis using aqueous acetic acid at temperatures between 20° and 40° C. Hydrolgenolysis is preferably effected in solution in an inert organic solvent e.g. an alkanol with a precious metal catalyst e.g. palladium or platinum.

The N-triarylmethyl derivative of the amino acid corresponding to the desired aminoacyl group is conveniently prepared from the free amino acid by the steps of esterifying the free amino acid with a lower alkanol, reacting the alkyl ester with a triarylmethyl halide to form the N-triarylmethyl derivative of the amino acid alkyl ester and hydrolysing the resulting N-triarylmethyl derivative under alkaline conditions to remove the alkyl group.

In order to illustrate in more detail the process according to the invention, the production of 7-(α-amino-α-phenylacetamido)-cephalosporanic acid will now be described in outline it being understood that this is given only to illustrate the invention and that the particular conditions described are not critical, except insofar as they are defined above.

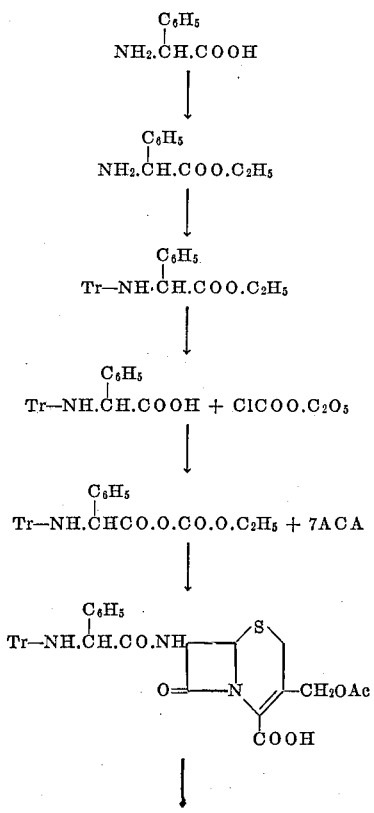

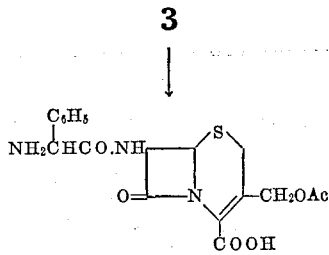

in which Tr=trityl (triphenylmethyl) and 7-ACA=7-aminocephalosporanic acid.

Aminoacyl analogues of cephalosporin which can with advantage be prepared by the process according to the invention are those in which R in the above general formula is

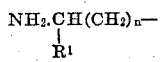

or

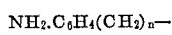

$n$ being 0 or an integer e.g. 1–10 and $R^1$ being a hydrogen atom or an alkyl aryl, aralkyl or carboxy group.

The compounds prepared according to the invention possess antibiotic activity particularly against gram positive organisms, 7-(p-aminophenylacetamido)-cephalosporanic acid in particular showed a high level of activity against such organisms and also possessed significant activity against gram negative organisms.

In order that the invention may be well understood the following examples are given by way of illustration. In each of the examples the N-trityl derivative of the amino acid was prepared via the ethyl ester as described above.

EXAMPLE 1

(a) Preparation of 7-(α-tritylamino-acetamido)-cephalosporanic acid

N-tritylglycine (1.67 g.) and triethylamine (0.70 ml.) were dissolved in chloroform (40 ml.) and cooled to 0°. The solution was stirred during the addition of ethyl chloroformate (0.45 ml.) and stirring continued for a further 15 minutes when a filtered solution of 7-aminocephalosporanic acid (1.0 g.) and triethylamine (0.7 ml.) in chloroform (40 ml.) previously cooled to 0° was added. After 1 hour at 0° the mixture was allowed to attain room temperature over 30 minutes, and the solvent removed under reduced pressure. The oily residue was dissolved in water (100 ml.) containing sodium bicarbonate (1.0 g.), washed with diethyl ether (2×50 ml.) and the aqueous residue adjusted to pH 2 with hydrochloric acid. The acid suspension was extracted with ethyl acetate (3×70 ml.) the bulked organic phase washed with water (2×25 ml.), dried over sodium sulphate and concentrated under reduced pressure to 20 ml. This solution was added to petroleum (B.P. 60–80°, 300 ml.) and the white precipitate collected, washed with petroleum and air-dried.

Yield=1.85 g. (88.1%)
$\lambda$ 262 m$\mu$ max. $E^{1\%}_{1 cm.}$=185 (ethanol 0.005%)
$R_f$ (butanol system)=0.85
$R_f$ (propanol system)=0.90

(b) Preparation of 7-(α-aminoacetamido) cephalosporanic acid (i) 7 - (α-tritylaminoacetamido)-cephalosporanic acid was dissolved in acetic acid (3.0 ml.) and water (3.0 ml.) added; a sticky gum was obtained which gradually dissolved over 2½ hours with the precipitation of white crystals. On addition of acetone (200 ml.) the crystalline precipitate dissolved and a white non-crystalline powder was obtained which was harvested, washed with acetone and air dried.

Yield=0.85 g. (81.8%)
$\lambda$ 260 m$\mu$ max. $E^{1\%}_{1 cm.}$=244 (water 0.005%)
$R_f$ (butanol system)=0.18
$R_f$ (propanol system)=0.12

(ii) 7-(α-tritylaminoacetamido)-cephalosporanic acid (50 mg.) was dissolved in ethanol (95%, 3.0 ml.) and shaken under hydrogen with palladium black (50 mg.) for 5 hours. Water (5.0 ml.) was added, the liquors decanted from the catalyst and freeze-dried to give a white residue.

$R_f$ (butanol system)=0.10
$R_f$ (propanol system)=0.12

EXAMPLE 2

(a) Preparation of 7-(α-methyl-α-tritylaminoacetamido)-cephalosporanic acid 7-aminocephalosporanic acid (1.0 g.) was condensed with N-trityl-dl-alanine (1.74 g.) as in Example 1(a)

Yield=1.58 g. (73.4%)
$\lambda$ 260 m$\mu$ max. $E^{1\%}_{1 cm.}$=167 (sodium salt in water 0.005%)
$R_f$ (butanol system)=0.87

(b) Preparation of 7-(α-amino-α-methylacetamido)-cephalosporanic acid

7 - (α - methyl - α - tritylaminoacetamido) - cephalosporanic acid (Example 3, 1.56 g.) was treated with acetic acid as in Example 1(b)(i) to give the free amine.

Yield=0.53 g. (58%)
$\lambda$ 256 m$\mu$ max. $E^{1\%}_{1 cm.}$=191 (sodium salt in water 0.005%)
$R_f$ (butanol system)=0.15
$R_f$ (propanol system)=0.22

EXAMPLE 3

(a) Preparation of 7-(α-phenyl-α-tritylaminoacetamido)-cephalosporanic acid

N-trityl-α-phenylglycine (2.04 g.) and triethylamine (0.70 ml.) in chloroform (40 ml.) was cooled to 0° and ethyl chloroformate (0.45 ml.) added; the solution was stirred at 0° for 30 minutes and a solution of 7-aminocephalosporanic acid (1.0 g.) in chloroform (40 ml.) and triethylamine (0.70 ml.) previously cooled to 0° added quickly. The mixture was stirred at 0° for 1 hour and at room temperature for 2 hours when the chloroform was removed under reduced pressure. The residue was partitioned between ethyl acetate (50 ml.) and sodium bicarbonate solution (50 ml., 3.2 N) and the organic phase washed with water (25 ml.), dried with sodium sulphate and distilled to dryness under reduced pressure. The residue was triturated with diethyl ether and the remaining white solid air-dried.

Yield=0.70 g. (29.5%)
$\lambda$ 261 m$\mu$ max. $E^{1\%}_{1 cm.}$=133 (methanol 0.005%)
$R_f$ (butanol system)=0.85
$R_f$ (propanol system)=0.91

(b) Preparation of 7-(α-amino-α-phenylacetamido)-cephalosporanic acid (i) 7-(α-phenyl - α - tritylaminoacetamido) - cephalosporanic acid (0.60 g.) was treated with acetic acid as in Example 1(b)(i) to give the free amine.

Yield=0.142 g. (37.8%)
$\lambda$ 258 m$\mu$ max. $E^{1\%}_{1 cm.}$=133 (water 0.005%)
$R_f$ (butanol system)=0.34
$R_f$ (propanol system)=0.35

(ii) 7-(α-phenyl - α - tritylaminoacetamido) - cephalosporanic acid (170 mg.) was dissolved in methanol (90%, 10 ml.) and added to a suspension of palladium on carbon (170 mg., 10% Pd) which had been prereduced under the same solvent. The mixture was shaken under hydrogen for 4.25 hours and diethyl ether (100 ml.) added; the catalyst and associated solid was harvested, washed with ether and dried. The catalyst was suspended in water (5.0 ml.), filtered, washed with water (10 ml.) and the combined aqueous extracts freeze-dried to give material identical to that obtained in Example 3(b)(i).

Yield=7.6 mg. (7.1%)
$\lambda$ 260 m$\mu$ max. $E_{1\,cm.}^{1\%}$=230 (water 0.005%)
$R_f$ (butanol system)=0.34
$R_f$ (propanol system)=0.35

EXAMPLE 4

(a) Preparation of 7-($\beta$-tritylaminopropionamido)-cephalosporanic acid 7-aminocephalosporanic acid (1.0 g.) was condensed with N-trityl-$\beta$-alanine (1.83 g., 1.5 mol.) as in Example 1(a)

Yield=2.056 g. (95.6%)
$\lambda$ 260 m$\mu$ max. $E_{1\,cm.}^{1\%}$=137
$R_f$ (butanol system)=0.82
$G_f$ (propanol system)=0.91

(b) Preparation of 7-($\beta$-aminopropionamido)-cephalosporanic acid 7-($\beta$-tritylaminopropionamido) - cephalosporanic acid (0.65 g.) was treated with acetic acid as in Example 1(b)(i) to give the free amine Yield=0.146 g. (38.3%)
$\lambda$ 259 m$\mu$ max. $E_{1\,cm.}^{1\%}$=218 (aqueous alkali 0.005%)
$R_f$ (butanol system)=0.85
$R_f$ (propanol system)=0.38

EXAMPLE 5

(a) Preparation of 7-($\beta$-phenyl-$\beta$-tritylaminopropionamido)-cephalosporanic acid $\beta$-phenyl-$\beta$-tritylaminopropionic acid (2.24 g.) was dissolved in chloroform (40 ml.) and triethylamine (0.7 ml.), the solution was stirred at 0° and ethyl chloroformate (0.45 ml.) added. After 75 minutes 7-aminocephalosporanic acid (1.0 g.) in chloroform (40 ml.) and triethylamine (0.7 ml.) was introduced and the reaction mixture stirred for 1 hour at 0°, then allowed to attain room temperature over 30 minutes. The solvent was removed under reduced pressure and the resultant solid partitioned between ethyl acetate (100 ml.) and sodium bicarbonate solution (2%, 100 ml.). The organic phase was dried over sodium sulphate and distilled to dryness to give a solid (2.4 g.) which was triturated with diethyl ether (50 ml.), filtered, washed well with ether and air-dried (1.1 g.). Solution in ethyl acetate (10 ml.) and precipitation with petroleum (300 ml. B.P. 60–80°) gave the title compound (0.84 g.). A further quantity was obtained by extracting the aqueous reaction mixture at pH 2 with ethyl acetate.

Yield (total) 1.276 g. (52.7%)
$\lambda$ 258–260 m$\mu$ max. $E_{1\,cm.}^{1\%}$=1.285
$R_f$ (butanol system)=0.85
$R_f$ (propanol system)=0.92

(b) Preparation of 7-($\beta$-amino-$\beta$-phenylpropionamido)-cephalosporanic acid 7-($\beta$-phenyl - $\beta$ - tritylaminopropionamido) - cephalosporanic acid (Example 9, 1.0 g.) was hydrolysed as in Example 1(b)(i) with acetic acid.

Yield=0.308 g. (48.8%)
$\lambda$ 258 m$\mu$ max. $E_{1\,cm.}^{1\%}$=175 (aqueous alkali 0.005%)
$R_f$ (butanol system)=0.28
$R_f$ (propanol system)=0.65

EXAMPLE 6

(a) Preparation of 7-(p-tritylaminophenylacetamido)-cephalosporanic acid 7-aminocephalosporanic acid (2.0 g.) was condensed with p-tritylaminophenyl acetic acid (4.3 g.) as in Example 1(a).

Yield=1.646 g. (34.6%)
$\lambda$ 256 m$\mu$ max. $E_{1\,cm.}^{1\%}$=304
$\lambda$ 235 m$\mu$ min. $E_{1\,cm.}^{1\%}$=233 } (ethanol 0.005%)
$R_f$ (butanol system)=0.80
$R_f$ (propanol system)=0.88

(b) Preparation of 7-(p-aminophenylacetamido)-cephalosporanic acid 7-(p-tritylaminophenylacetamido)-cephalosporanic acid (1.0 g.) was hydrolysed as in Example 1(b)(i) to give the title compound.

Yield=0.256 g. (4%)
$\lambda$ 242 m$\mu$ max. $E_{1\,cm.}^{1\%}$=379
$\lambda$ 265 m$\mu$ inflexion $E_{1\,cm.}^{1\%}$=241 } (aqueous alkali 0.005%)
$R_f$ (butanol system)=0.35
$R_f$ (propanol system)=0.67

EXAMPLE 7

(a) Preparation of 7-L-$\gamma$-carboxy-$\gamma$-tritylaminobutyramido)-cephalosporanic acid N-trityl-L-glutamic acid (1.58 g.) and triethylamine (1.12 ml.) were dissolved in dioxan (50 ml. with enough acetone to prevent freezing (ca. 5–6 ml.). The mixture was stirred and cooled to 0° when ethyl chloroformate (0.39 ml.) in acetone (4 ml.) was added; after 30 minutes 7-aminocephalosporanic acid (1.0 g.) and triethylamino (0.52 ml.) in water (4 ml.) was introduced and the reaction stirred at room temperature for 2 hours. On completion, water (150 ml.) was added, the suspension extracted with diethyl ether (2×50 ml.), the aqueous phase acidified to pH 1.5 and extracted with ethyl acetate (3×150 ml.). The bulked ethyl acetate extracts were washed with water, dried and distilled to 20 ml. under reduced pressure; the product was obtained when petroleum (300 ml., B.P. 60–80°) was added to the ethyl acetate solution.

Yield=1.43 g. (65%)
$\lambda$ 261 m$\mu$ max. $E_{1\,cm.}^{1\%}$=132
$\lambda$ 253 m$\mu$ min. $E_{1\,cm.}^{1\%}$=130 } (methyl alcohol 0.005%)
$R_f$ (butanol system)=0.79
$R_f$ (propanol system)=0.85

(b) Preparation of 7-(L-$\gamma$-amino-$\gamma$-carboxybutyramido)-cephalosporanic acid 7-(L-$\gamma$-carboxy - $\gamma$ - tritylaminobutyramido)-cephalosporanic acid (1.0 g.) was hydrolysed as in Example 1(b)(i) to give the free amine.

Yield=0.290 g. (46.5%)
$\lambda$ 260 m$\mu$ max. $E_{1\,cm.}^{1\%}$=172
$R_f$ (butanol system)=0.16
$R_f$ (propanol system)=0.20

EXAMPLE 8

(a) Preparation of 7-(11-tritylaminoundecylamido)-cephalosporanic acid 7-aminocephalosporanic acid (1.0 g.) was condensed with $\omega$-tritylaminoundecanoic acid (1.63 g.) as in Example 1(a).

Yield=1.00 g. (39%)
$\lambda$ 255 m$\mu$ inflexion $E_{1\,cm.}^{1\%}$=124 (0.005% methanol)
$R_f$ (butanol system)=0.82
$R_f$ (propanol system)=0.93

(b) Preparation of 7-(11-aminodecylamido)-cephalosporanic acid 7-(11-tritylaminoundecylamido) - cephalosporanic acid (0.40 g.), was hydrolysed with acetic acid (0.75 ml.) and water (0.75 ml.) at 37° for 4 hours. The title compound was obtained in poor yield in the acetone soluble fraction $R_f$ (butanol system)=0.30
$R_f$ (propanol system)=0.72

EXAMPLE 9

(a) Preparation of 7(dl-β-tritylamino-β-carboxy-propionamido)-cephalosporanic acid This was prepared by the method of Example 1(a)

Yield=67%
λ 257 mμ inflexion $E^{1\%}_{1cm.}=118$
$R_f$ (butanol system)=0.86

(b) Preparation of 7(dl-β-amino-β-carboxypropion-amido)-cephalosporanic acid

This was prepared from the product of Example 9(a) by the method of Example 1(b)

Yield=52%
λ 258 mμ max. $E^{1\%}_{1cm.}=125$
$R_f$ (butanol system)=0.087

MINIMUM INHIBITORY CONCENTRATIONS

| Example | Compound | Organism | |
|---|---|---|---|
| | | Staph. aureus 604 | Staph. aureus 663 |
| 1 | 7-(α-aminoacetamido)-cephalosporanic acid. | 125γ/ml. | 31γ/ml. |
| 2 | 7-(α-amino-α-methylacetamido)-cephalosporanic acid. | 250 | 250 |
| 3 | 7-(α-amino-α-phenylacetamido)-cephalosporanic acid. | 31 | 2.5 |
| 4 | 7-(β-aminopropionamido)-cephalosporanic acid. | >2.5 | >2.5 |
| 5 | 7-(β-amino-β-phenylpropionamido)-cephalosporanic acid. | 2.5 | 1.25 |
| 6 | 6-(p-aminophenylacetamido)-cephalosporanic acid. | 0.62 | 0.16 |
| 7 | 7-(1-γ-amino-γ-carboxybutyramido cephalosporanic acid. | 12.5 | 6.25 |
| 9 | 7-(dl-β-amino-β-carboxypropion-amido cephalosporanic acid. | >2.5 | >2.5 |

EXAMPLE 10

Preparation of 7-(4'-amino-1'-naphthalene acetamido)-cephalosporanic acid 4-amino-1-naphthalene acetic acid was prepared by a modification of the method of Ogata et al. [J. Org. Chem. 16, 1588 (1951)] and its methyl ester hydrochloride by solution in methanol and passage of dry hydrogen chloride.

3.823 g. of the methyl ester hydrochloride was then suspended in 50 ml. dry chloroform and 4.68 ml. (2.2 equiv.) of triethylamine added, followed by the addition of 9.35 g. (2.2 equiv.) of triphenyl methyl chloride. The mixture was stoppered and left for 24 hours, extracted with 1 volume of water and the aqueous extract back-extracted with 2×1 volume of chloroform. All chloroform layers were bulked, dried over $Na_2SO_4$ and evaporated to dryness, and finally dried from methanol. Yield: 11.94 g.

This impure solid was then directly converted to the free acid by refluxing with 15 ml. 15% sodium hydroxide in 60 ml. propylene glycol for 2 hours. The pH was then adjusted to 5.0 and extracted with 3×1 volume of ethyl acetate. Dried over $Na_2SO_4$ and evaporated in vacuo to 50 ml. and excess 60/80 petrol, ether added. A crystalline deposit formed overnight. Yield: 1.254 g.

1.254 g. of the N-trityl derivative were dissolved in 40 ml. chloroform plus 0.292 g. (1 equiv.) of triethylamine and 0.315 g. (1 equiv.) of ethyl chloroformate. The solution was stirred for 30 min. in an ice bath and then 0.720 g. (0.91 equiv.) of 7-aminocephalosporanic acid separately dissolved in 40 ml. of chloroform and 0.41 ml. (1.1 equiv.) of triethyl-amine were added over 15 min. The solution was stirred for 1½ hours at room temperature. The chloroform was removed in vacuo and the solid resuspended in 10 ml. 50% aqueous acetic acid for 3 hours to remove the trityl group. The solution was diluted and pH adjusted to 7.0. It was then extracted with 3×1 vol. of ethyl acetate. The aqueous layer was adjusted to pH 2.5 and extracted with 3×1 vol. of ethyl acetate, dried over $Na_2SO_4$, evaporated in vacuo to about 10 ml. and precipitated with 60/80 petrol ether. Yield: 90 mg.

This product gave one zone moving with $R_{7PACA}=0.73$ in the ethyl acetate solvent system on pH 5 buffered papers.

μv. showed a shoulder at 240 mμ with $$E^{1\%}_{1cm} 340=203$$

and $$E^{1cm.}_{1\%} 260 mμ=154$$

The product was chromatographically similar to material prepared by catalytic hydrogenation of 4-nitro-1-naphthalene acetamodicephalosporanic acid, had infra red and ultra violet spectra identical with this 4-amino-1-naphthalene-acetamidocephalosporanic acid but was obviously impure because of the low $$λ 260 mμ E^{1cm.}_{1\%} =154$$

compared with the $$λ 260 mμ E^{1cm.}_{1\%} =240$$

for the purer compound.

Biological activity expressed as MIC in μg./ml. for 7-(4'-amino-1'-naphthalene-acetamido)-cephalosporanic acid are quoted below.

| Organism | MIC ug/ml. in vitro |
|---|---|
| Staph. aureus, 604 | 0.32 |
| Staph. aureus, 663 | 0.32 |
| Staph. aureus, 3452 | 1.00 |
| E. coli, 573 | >250 |
| S. typhimurium, 804 | >250 |
| Pr. vulgaris, 431 | 62.5 |
| Ps. pyocyanea, 150 | >250 |
| C. albicans, C316 | >250 |

We claim:
1. A process for the production of an amino acyl analog of cephalosporin C which comprises reacting 7-amino cephalosporanic acid with a mixed anhydride of a lower alkanoic acid and of an amino acid selected from those of the formulae

$$R—NH—C(CH_2)_n—COOH$$
$$\phantom{R—NH—}|$$
$$\phantom{R—NH—}R_1$$

where R is trityl and n is not greater than 10 and $R^1$ is hydrogen, lower alkyl, phenyl, benzyl and carboxy and $$R—NH—R^2—(CH_2)_n—COOH$$

where R and n are as defined above and $R^2$ is phenylene or napthylene and thereafter removing the trityl group by hydrolysis with an aqueous acid at a pH of 1 to 5 and at a temperature of 0–50° C.

2. A process as defined in claim 1 wherein the hydrolysis is carried out using aqueous acetic acid at a temperature between 20 and 40° C.

3. A compound of the formula $$NH_2 \cdot R(CH_2)_n \cdot CO \cdot NH \cdot CH—CH \overset{S}{\diagdown} CH_2$$
$$\phantom{xxxxxxxxxxxxxxxx} | \phantom{xx} | \phantom{xxxx} |$$
$$\phantom{xxxxxxxxxxxxx} O=C—N \diagdown \phantom{x} C—CH_2OAc$$
$$\phantom{xxxxxxxxxxxxxxxxxxxxx} C$$
$$\phantom{xxxxxxxxxxxxxxxxxxxxx} |$$
$$\phantom{xxxxxxxxxxxxxxxxxxxx} CO_2H$$

where R is phenylene, n being not greater than 10.

4. 7-(p-aminophenylacetamido)-cephalosporanic acid.

References Cited

UNITED STATES PATENTS

| | | | |
|---|---|---|---|
| 3,234,223 | 2/1966 | Fechtig et al. | 260—243 |
| 3,173,916 | 3/1965 | Shull et al. | 260—243 |
| 2,985,648 | 5/1961 | Doyle et al. | 260—239.1 |
| 3,120,514 | 2/1964 | Doyle et al. | 260—239.1 |
| 3,167,549 | 1/1965 | Hoover | 260—243 |
| 3,167,550 | 1/1965 | Chow et al. | 260—243 |

(Other references on following page)

OTHER REFERENCES

Advances in Organic Chemistry, (Methods and Results) by John Wiley and Sons, Inc., vol. 3, pp. 204–205, 1963, QD251A3.

Zervas et al.: Journ. American Chemical Soc., vol. 78, pp. 1359–1363, 1956, 2D1A5.

Abraham et al. (1): Endeavour, vol. XX, No. 78, pp. 92–100, (April 1961).

Abraham et al. (II): Biochemical Journal, vol. 79, pp. 377–393, pp. 377–380 mainly relied upon (1961).

NICHOLAS S. RIZZO, *Primary Examiner.*

DONALD G. DAUS, *Assistant Examiner.*

U.S. Cl. X.R.

260—690, 390, 546, 471, 518, 997